(12) United States Patent
Yasui et al.

(10) Patent No.: US 7,311,316 B2
(45) Date of Patent: Dec. 25, 2007

(54) STABILIZER CONTROL APPARATUS

(75) Inventors: Yoshiyuki Yasui, Nagoya (JP); Shingo Urababa, Toyota (JP); Shuuichi Buma, Toyota (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 282 days.

(21) Appl. No.: 11/056,363

(22) Filed: Feb. 14, 2005

(65) Prior Publication Data

US 2005/0179221 A1 Aug. 18, 2005

(30) Foreign Application Priority Data

Feb. 12, 2004 (JP) ............................. 2004-034498

(51) Int. Cl.
B60G 17/015 (2006.01)
B60G 17/016 (2006.01)
B60G 21/055 (2006.01)

(52) U.S. Cl. .............................. 280/5.511; 280/5.505; 280/5.506; 280/124.106

(58) Field of Classification Search ............. 280/5.502, 280/5.506, 5.507, 5.508, 5.511, 124.106, 280/124.107, 124.137, 124.149, 124.152
See application file for complete search history.

(56) References Cited

U.S. PATENT DOCUMENTS

| 6,354,607 | B1 | 3/2002 | Kawashima et al. | |
| 6,425,585 | B1 | 7/2002 | Schuelke et al. | |
| 6,435,531 | B1* | 8/2002 | Acker et al. | 280/124.107 |
| 6,550,788 | B2* | 4/2003 | Schmidt et al. | 280/5.511 |
| 7,129,659 | B2* | 10/2006 | Buma et al. | 318/432 |
| 2005/0236793 | A1* | 10/2005 | Taneda et al. | 280/124.107 |

FOREIGN PATENT DOCUMENTS

| EP | 1 426 208 A1 | 6/2004 |
| JP | 2000-71737 | 3/2000 |
| JP | 2000-71739 A | 3/2000 |
| JP | 2002-518245 A | 6/2002 |
| WO | WO 99/67100 A1 | 12/1999 |
| WO | 2004/010555 A2 | 1/2004 |

OTHER PUBLICATIONS

Technology Report of BMW (Internet) cited in the Specification at p. 1, 4 pgs.
European Search Report dated Jan. 18, 2006.

* cited by examiner

Primary Examiner—Eric Culbreth
Assistant Examiner—Joseph Rocca
(74) Attorney, Agent, or Firm—Buchanan Ingersoll & Rooney PC

(57) ABSTRACT

In a stabilizer control apparatus for a vehicle, a stabilizer includes a pair of stabilizer bars disposed between a right wheel and a left wheel of the vehicle, and an actuator having an electric motor and a speed reducing mechanism disposed between the stabilizer bars. A turning determination device is provided for determining change in turning operation of the vehicle. And, a controller is provided for changing a control parameter of the electric motor in response to the result determined by the turning determination device, to control a torsional rigidity of the stabilizer. As for control parameters of the electric motor, may be employed a desired value of electric current for actuating the electric motor, for example.

7 Claims, 11 Drawing Sheets

STABILIZER CONTROL APPARATUS

This application claims priority under 35 U.S.C. Sec. 119 to No.2004-034498 filed in Japan on Feb. 12, 2004, the entire content of which is herein incorporated by reference.

BACKGROUND OF THE INVENTION

1. Field of the Invention

The present invention relates to a stabilizer control apparatus for a vehicle, and more particularly to an apparatus for controlling a torsional rigidity of a stabilizer disposed between a right wheel and a left wheel, by means of an electrically operated actuator.

2. Description of the Related Arts

In general, a stabilizer control apparatus for a vehicle is provided for applying an appropriate roll moment to a vehicle by means of a stabilizer while the vehicle is performing a turning operation, to reduce or restrict a rolling motion of the vehicle body. In order to achieve this function, a system called "Dynamic Drive" has been proposed to reduce the rolling motion by actively using hydraulic pressure, in a Technology Report of BMW as retrieved on Dec. 8, 2003 from Internet (URL: http://www.bmwgroup.com/e/0_0_www_bmwgroup_com/7_innovation/7_3_technologie/7_3_4_dynamic_drive.shtml). In that report, it is stated that two pressure control valves are responsible for regulating the required pressure and a pilot valve determines the direction of the counter-torque moments (left-hand or right hand curve). To ensure that the valves operate optimally, the controller evaluates the pressure signal for the front and rear axle stabilizers, the lateral acceleration signal, and the CAN signals reporting both longitudinal and lateral movements of other controllers (DSC etc.). By evaluating the CAN signals, the Dynamic Drive controller obtains a great amount of additional information which it uses to test the plausibility and selection of the incoming signals.

Also, an active roll restraining control apparatus using an electric system has been known heretofore. For example, Japanese Patent Laid-open Publication No.2000-71739 discloses an apparatus for controlling efficiency of a stabilizer to vary an apparent torsional rigidity of the stabilizer by driving and controlling an actuator in response to a turning level of a vehicle. In practice, driving force of an electromagnetic linear actuator is calculated on the basis of signals of various sensors, and converted into electric value to provide a desired electric value for performing a PID control. And, it is described that the actuator is actuated to enlarge or shorten the stabilizer, so as to provide an appropriate torsional rigidity for it, by feeding exciting current to a stator having laminated plates with coils connected together in a three-phase delta circuit, in response to a synchronous signal based on the output of position detecting means, and feeding actual current back to it.

Furthermore, in the U.S. Pat. No. 6,425,585 (corresponding to International Publication No. WO9967100, and Japanese Patent Laid-open Publication No. 2002-518245), there is disclosed a system for stabilizing vehicles against rolling, with at least one slewing drive arranged between halves of the front and/or rear chassis stabilizer, thus creating an initial stress of the stabilizer halves to reduce or suppress the rolling motion and, in the event of roll, applying a counter-torque to the vehicle body as a function of output signals of a sensor for detecting a roll parameter. The slewing drive includes three basic components, namely an electric motor, a step-down gear and a brake disposed between them. The torque generated by the electric motor is converted by the step-down gear into the torque needed for the initial stress of the stabilizers. One stabilizer half is via a bearing mount connected directly to the casing of the electromechanical slewing drive and the other stabilizer half is connected to the output end (high torque end) of step-down gear and is mounted in the bearing mount.

It can be said that the Dynamic Drive system as described above relates to an active roll restraining control apparatus using an electric-hydraulic pressure system, which controls a proportional pressure valve and directional control valve in response to a signal of a pressure sensor, to perform a so-called pressure control. According to the apparatus for restraining the roll actively by means of the stabilizer, in order to restrain the rolling motion when the vehicle is turning, a roll moment is provided by controlling the stabilizer, against the roll moment created by inertia force applied to the vehicle body during the turning operation. Therefore, it is required to provide the pressure for the stabilizer actuator, which is converted directly into the roll moment, to perform a feed-back control.

On the other hand, in the Japanese Patent Laid-open Publication No.2000-71739, there is disclosed an embodiment of the apparatus which is provided with the electromagnetic linear actuator to be moved linearly, between the stabilizer bars and suspension members. However, any other practical examples of the actuator have not been disclosed. Particularly, it is silent about the actuator having the electric motor and the step-down gear as disclosed in the U.S. Pat. No. 6,425,585, However, in the case where the force output from the electric motor is transmitted via the step-down gear, which act as a speed reducing mechanism, a problem may be caused as follows. That is, the speed reducing mechanism provided for the actuator has a normal efficiency for transmitting the force from the electric motor to the vehicle body, and a reverse efficiency for transmitting the force output from vehicle body to the electric motor. Due to the efficiency (normal efficiency and reverse efficiency) of the speed reducing mechanism, if the active roll moment is provided for the roll restraining control on the basis of a lateral acceleration (actual lateral acceleration, or calculated lateral acceleration), the rolling motion may not be converged properly.

SUMMARY OF THE INVENTION

Accordingly, it is an object of the present invention to provide a stabilizer control apparatus which includes an actuator having an electric motor and a speed reducing mechanism, and which improves a convergence of rolling motion of a vehicle body in view of a transmitting efficiency of the speed reducing mechanism.

In accomplishing the above and other objects, the stabilizer control apparatus is provided with a stabilizer including a pair of stabilizer bars disposed between a right wheel and a left wheel of a vehicle, and an actuator having an electric motor and a speed reducing mechanism disposed between the stabilizer bars. The apparatus is also provided with a turning determination device for determining change in turning operation of the vehicle, and a controller for changing a control parameter of the electric motor in response to the result determined by the turning determination device, to control a torsional rigidity of the stabilizer. As for the control parameter of the electric motor, may be employed a desired value of electric current for actuating the electric motor, for example.

Or, the stabilizer control apparatus may be provided with a stabilizer including a pair of stabilizer bars disposed between a right wheel and a left wheel of the vehicle, and an actuator having an electric motor and a speed reducing mechanism disposed between the stabilizer bars, a turning determination device for determining change in turning operation of the vehicle, and a controller for rapidly reducing electric current fed to the electric motor, when the turning determination device determines that the turning operation of the vehicle is being decreased, to control a torsional rigidity of the stabilizer.

In the apparatus as described above, the state that turning operation of the vehicle is being decreased (abbreviated as decreased turning operation) corresponds to such a state that a degree of the turning operation of the vehicle, which can be indicated by a lateral acceleration, is decreased to be close to a straight moving operation of the vehicle. Also, as described hereinafter, a state that the turning operation of the vehicle is being held (abbreviated as holding turning operation) corresponds to such a state that a degree of the turning operation of the vehicle is held to be of a constant value, and a state that the turning operation of the vehicle is being increased (abbreviated as increased turning operation) corresponds to such a state that a degree of the turning operation of the vehicle is increased.

In the stabilizer control apparatus as described above, the controller may be constituted to rapidly reduce the electric current fed to the electric motor, to be smaller than the electric current corresponding to a value of a normal efficiency of the speed reducing mechanism and a reverse efficiency thereof multiplied together, when the turning determination device determines that the turning operation of the vehicle is being decreased.

Or, the stabilizer control apparatus may be provided with a stabilizer including a pair of stabilizer bars disposed between a right wheel and a left wheel of the vehicle, and an actuator having an electric motor and a speed reducing mechanism disposed between the stabilizer bars, a turning determination device for determining change in turning operation of the vehicle, and a controller for reducing electric current fed to the electric motor, when the turning determination device determines that the turning operation of the vehicle is being held, to control a torsional rigidity of the stabilizer.

In the stabilizer control apparatus as described above, the controller may be constituted to reduce the electric current fed to the electric motor, within a range greater than the electric current corresponding to a value of a normal efficiency of the speed reducing mechanism and a reverse efficiency thereof multiplied together, when the turning determination device determines that the turning operation of the vehicle is being held.

In the stabilizer control apparatus as described above, the controller may be constituted to rapidly increase the electric current fed to the electric motor, to come to be in such a condition of the electric motor that the turning operation of the vehicle is being increased, when the turning determination device determines that the turning operation of the vehicle is being increased, in the case where the controller is reducing the electric current fed to the electric motor, while the turning operation of the vehicle is being held.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
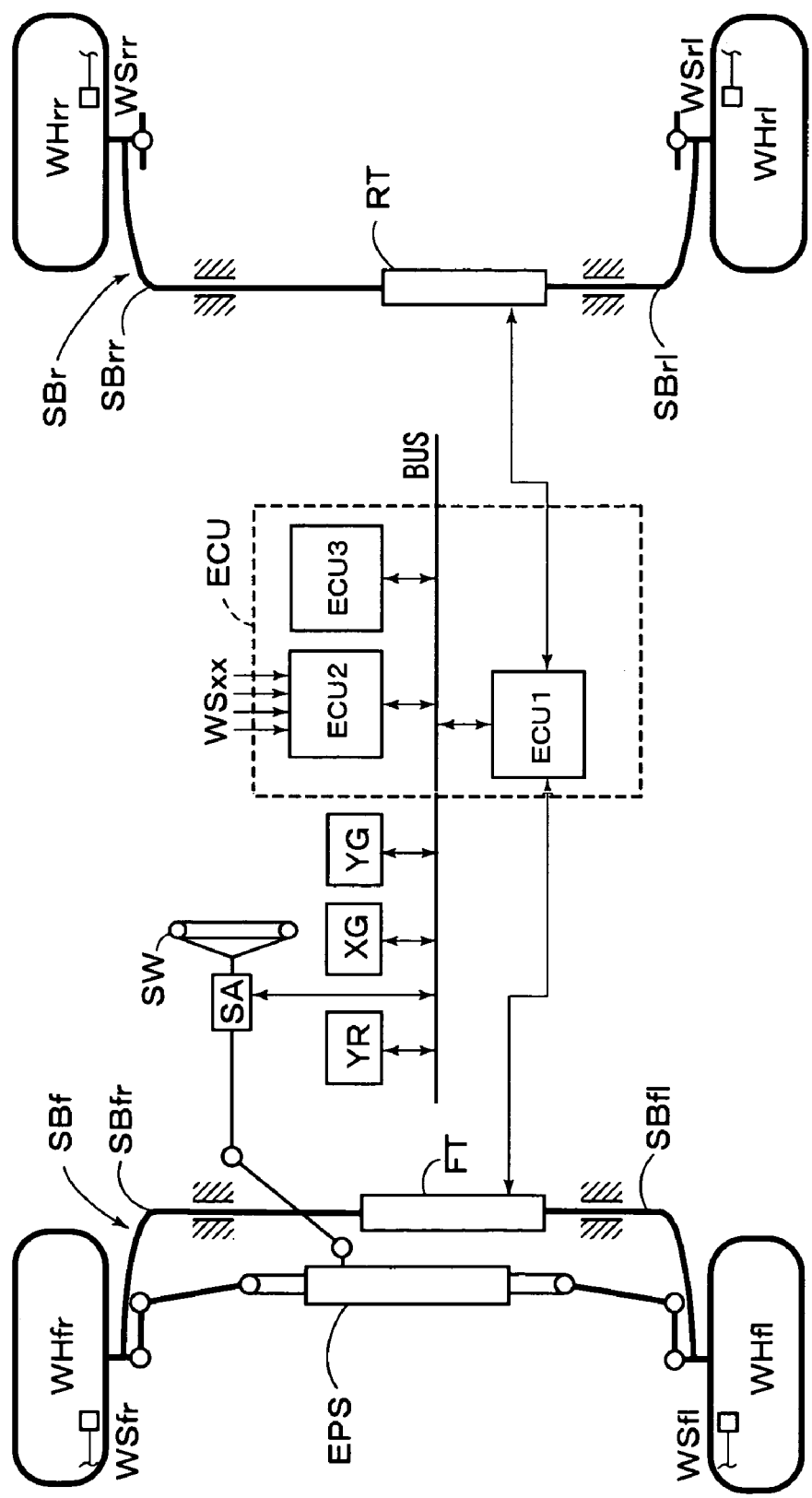
FIG. 1 is a schematic block diagram of a vehicle having a stabilizer control apparatus according to an embodiment of the present invention.

Referring to FIG. 1, there is schematically illustrated a vehicle with a stabilizer control apparatus according to an embodiment of the present invention. As shown in FIG. 1, a front stabilizer SBf and a rear stabilizer SBr are disposed to act as a torsion spring when a roll motion is applied to a vehicle body (not shown). The front stabilizer SBf and rear stabilizer SBr are actuated by stabilizer actuators FT and RT, respectively, to control each torsional rigidity, so as to restrain a roll angle of vehicle body resulted from a rolling motion of the vehicle body. The stabilizer actuators FT and RT are controlled by a stabilizer control unit ECU1 provided in an electronic controller ECU.

As shown in FIG. 1, at each wheel WHxx of the vehicle, there is provided a wheel speed sensor WSxx, which is connected to the electronic controller ECU, and by which a signal having pulses proportional to a rotational speed of each wheel, i.e., a wheel speed signal is fed to the electronic controller ECU. "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. Furthermore, there are provided a steering angle sensor SA for detecting a steering angle (handle angle) ($\delta f$) of a steering wheel SW, a longitudinal acceleration sensor XG for detecting a vehicle longitudinal acceleration Gx, a lateral acceleration sensor YG for detecting a vehicle lateral acceleration (Gy), a yaw rate sensor YR for detecting a yaw rate (Yr) of the vehicle, and so on, which are electrically connected to the electronic controller ECU. In addition to the stabilizer control unit ECU1 as described above, the electronic controller ECU includes a brake control unit ECU2, steering control unit ECU3 and the like, which are connected to a communication unit (not shown) having a CPU, ROM and RAM for communication, through a communication bus. Therefore, the information for each control system can be fed from other control systems.

Figure 2:
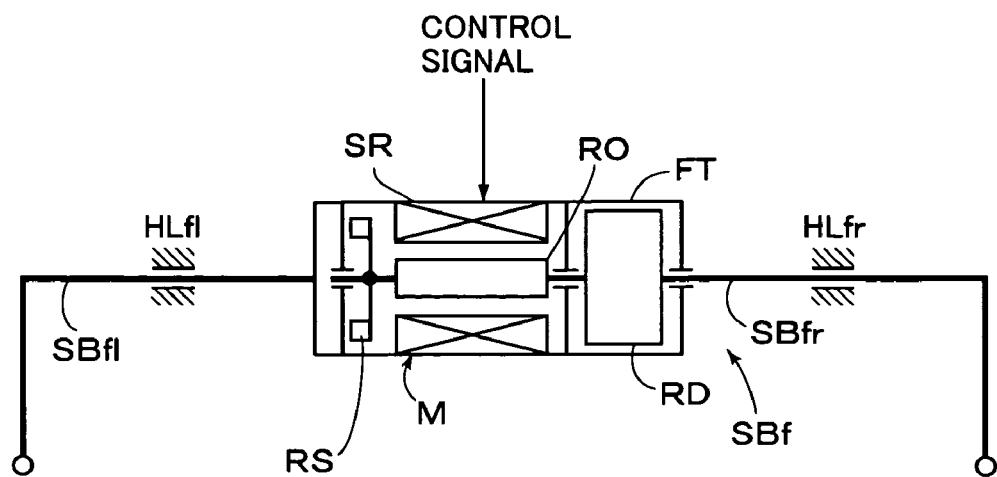
FIG. 2 is a block diagram illustrating a practical example of a stabilizer actuator according to an embodiment of the present invention.

As shown in FIG. 2, the stabilizer actuator FT includes a front stabilizer SBf, which is provided with a pair of (riqht and left) stabilizer bars SBfr and SBfl, one end of each bar is connected to a right or left wheel (not shown), and the other end of one bar is connected to a rotor RO of an electric motor M through a speed reducing mechanism (or, speed reducer) RD, and the other end of the other one bar is connected to a stator SR of the motor M. The stabilizer bars SBfr and SBfl are mounted on a vehicle body (not shown) by holding members HLfr and HLfl. The stabilizer actuator RT is constituted in the same manner as described above. When the motor M is energized, torsion force is created on each of the divided stabilizer bars SBfr and SBfl, so that apparent torsion spring property of the front stabilizer SBf is changed, whereby the roll rigidity of the vehicle body is controlled. A rotational angle sensor RS is disposed in the stabilizer actuator FT, to act as a rotational angle detection device for detecting a rotational angle of the motor M.

Figure 3:
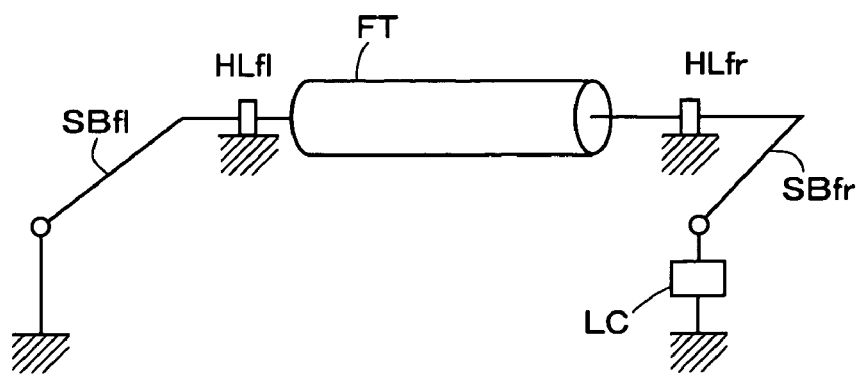
FIG. 3 is a schematic diagram showing an example of a device for testing a stabilizer actuator for use in an embodiment of the present invention.
Figure 4:
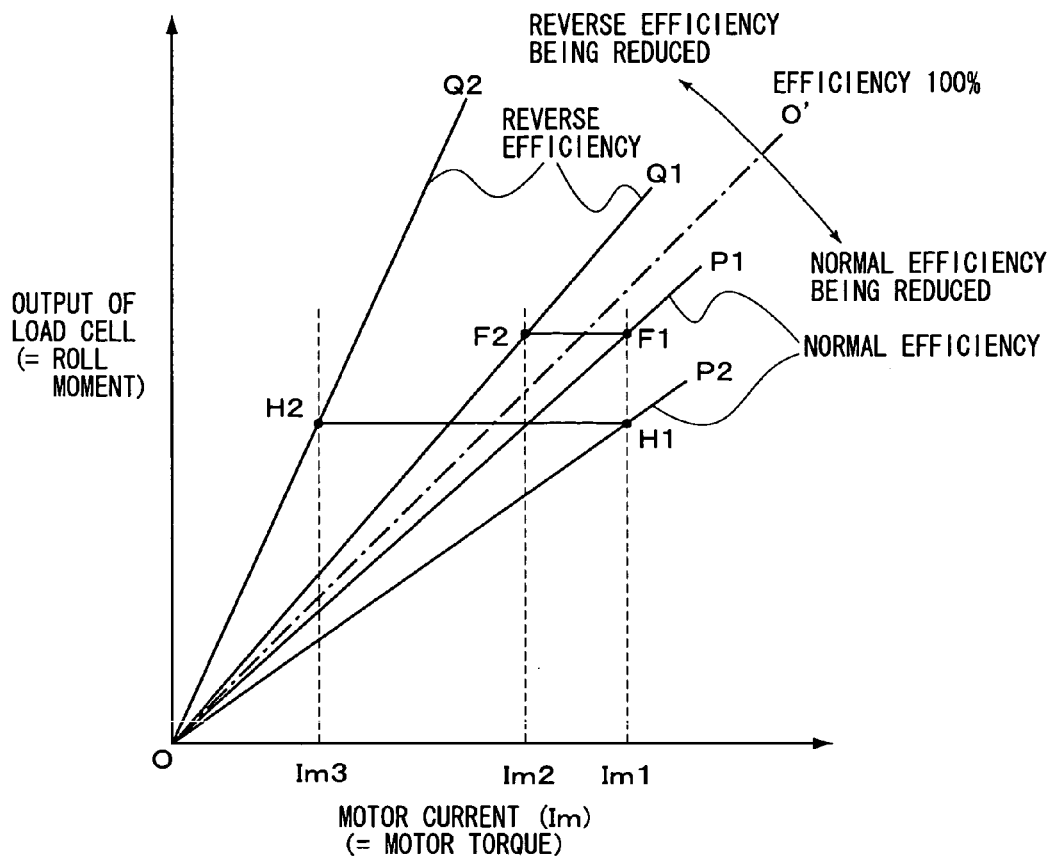
FIG. 4 is a diagram showing an example of a relationship between electric current for actuating an electric motor and roll moment, with respect to a result measured by the device as shown in FIG. 3.
Figure 5:
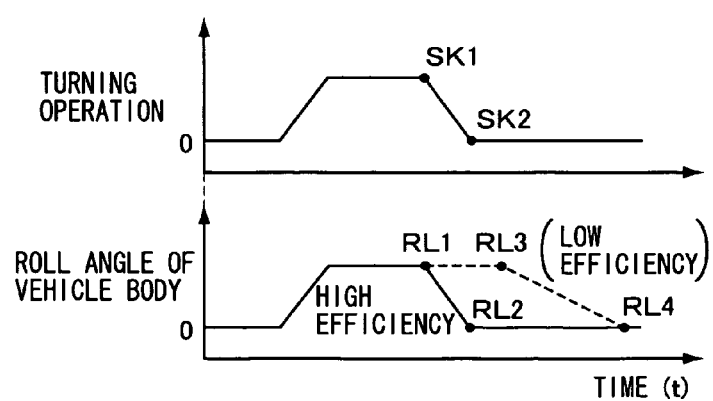
FIG. 5 is a diagram showing a relationship between turning operation of a vehicle and roll angle of a vehicle body according to an embodiment of the present invention.

Referring to FIGS. 3-5, the background of the present invention as described before will be explained in detail hereinafter. According to the present invention, the stabilizer control apparatus includes the stabilizer actuator having the electric motor M served as a power source, and the speed reducing mechanism RD for transmitting the power, with a normal efficiency and a reverse efficiency. For example, the stabilizer actuator FT as constituted in FIG. 2 is connected to the divided stabilizer bars SBfr and SBfl, as shown in FIG. 3, Then, the electric current (Im) fed to the motor M for actuating the stabilizer actuator FT is detected, and load applied thereto is detected by a load cell LC. In this case, the stabilizer bars SBfr and SBfl are held by the holding members HLfr and HLfl. The electric current (Im) for actuating the motor M is in approximately proportional relationship with the torque output from the motor M, so that it is of a value corresponding to the output of the motor M. And, the output (detected value) of the load cell LC corresponds to the roll moment created by the stabilizer bars SBfr and SBfl.

FIG. 4 shows a property of the stabilizer actuator FT measured by a testing device as constituted in FIG. 3, In FIG. 4, the origin (0) is indicated by "O", and a reference line indicative of efficiency 100% is indicated by a line segment O-O'. The efficiency 100% means that both of the normal efficiency and reverse efficiency of the stabilizer actuator FT are 100%, to provide a property with a gradient "1" on a coordinate plane with X-axis and Y-axis having the same dimension. In an area defined between the X-axis and the line segment O-O', the motor M applies a torsion to the stabilizer bars SBfr and SBfl, to provide the normal efficiency. If the X-axis and Y-axis are indicated by the same dimension, like those used for indicating the property of efficiency 100%, the normal efficiency may be indicated by a property with a gradient "NP". On the other hand, the reverse efficiency is provided in an area defined between the Y-axis and the line segment O-O'. If the reverse efficiency is indicated by "$\eta N$", however, the reverse efficiency will be indicated by a property with a gradient "$1/\eta N$" on the plane with X-axis and Y-axis as shown in FIG. 4, because the input-output relationship is reversed comparing with that of the normal efficiency. Therefore, in the case where the apparatus includes the speed reducing mechanism with relatively low normal efficiency and relatively low reverse efficiency, the property will be away from the efficiency 100% (line segment O-O') and close to the X-axis and Y-axis, respectively. In FIG. 4, an example of the speed reducing mechanism with relatively high normal efficiency and relatively high reverse efficiency is indicated by a line segment O-P1 and a line segment O-Q1, respectively, whereas an example of the speed reducing mechanism with relatively low normal efficiency and relatively low reverse efficiency is indicated by a line segment O-P2 and a line segment O-Q2, respectively.

In the case where the electric current (Im) for actuating the motor M is once gradually increased from its zero point (origin "O") to the electric current (Im1), and then it is gradually decreased toward its zero point, the property will be provided as follows. That is, in the case where the efficiency of the speed reducing mechanism RD is relatively high, to provide the normal efficiency property O-P1 and the reverse efficiency property O-Q1, if the electric current (Im) for actuating the motor M is increased from its zero point to the electric current (Im1), the load cell LC will generate its output, to provide a property tracing the normal efficiency property O-P1 from the origin "O" to a point "F1". Then, if the electric current (Im) is decreased from the electric current (Im1) to the zero point, the load cell LC will generate its output, to provide a property tracing the reverse efficiency property O-Q1. In the case where a transition of the normal efficiency property O-P1 to the reverse efficiency O-Q1 is performed, however, the motor M is in its locked state due to a power balance, to provide a range of "F1-F2". When the electric current (Im) is decreased furthermore, the motor M begins to be returned by the torsion force created by the stabilizer bars SBfr and SBfl, at an intersection F2 of the reverse efficiency O-Q1 and the electric current (Im2). Therefore, in the case where the electric current (Im) is increased from its zero point to the electric current (Im1), and then decreased toward its zero point (origin "O"), a property tracing "O-F1-F2-O" as shown in FIG. 4 will be provided.

On the contrary, in the case where the efficiency of the speed reducing mechanism RD is relatively low, to provide the normal efficiency property O-P2 and the reverse efficiency property O-Q2, the load cell LC will generate its output, to provide a property tracing "O-H1-H2-O". Thus, in the case where the efficiency of the speed reducing mechanism RD is relatively low, not only such a problem that the output of the stabilizer actuator FT becomes low in response to the electric current (Im) fed thereto, but also such a problem that the locked state of the motor M exists in a relatively wide range (range of "H1-H2") of the electric current (Im) have to be solved. In the latter case, the motor M will not be returned by the external force created by the stabilizer bars SBfr and SBfl, to maintain the locked state of the stabilizer bars SBfr and SBfl, until the electric current (Im) will be decreased to the electric current (Im3).

According to the property of the stabilizer actuator FT as shown in FIG. 4, an actual vehicle performance might be affected as follows. If the efficiency (normal efficiency and reverse efficiency) of the speed reducing mechanism RD is relatively high, the apparatus can be of a relatively high responsibility, and an effective control of roll angle can be performed in response to a change in turning operation (turning condition) of the vehicle, to provide a property of "RL1-RL2" as shown in FIG. 5, However, if the efficiency of the speed reducing mechanism RD is relatively low, the apparatus might provide a property as indicated by a broken line in FIG. 5, That is, irrespective of the case where the vehicle is returned from its turning operation (SK1) to its operation of moving straight (SK2) as shown in the upper part of FIG. 5, the roll angle of the vehicle body will be remained, to provide a property of "RL1-RL3" as shown in FIG. 5, Also, the convergence of roll angle of the vehicle body will not be achieved rapidly in response to the turning operation of the vehicle as indicated by "RL3-RL4" in FIG. 5, so that the convergence speed of roll angle will be reduced, comparing with the property of "RL1-RL2" in FIG. 5, In contrast, according to the present invention as constituted hereinafter, in the case where the vehicle is in a decreased turning operation to converge the rolling motion of the vehicle body, the electric motor M is controlled properly in view of the efficiency of the speed reducing mechanism RD, thereby to improve the convergence of rolling motion of the vehicle body. Also, as shown in FIG. 4, an appropriate control of the stabilizer actuator can be achieved properly, using effectively the range in which the stabilizer actuator FT is in the locked state of its motor (range of "H1-H2" or "F1-F2" in FIG. 4).

Figure 6:
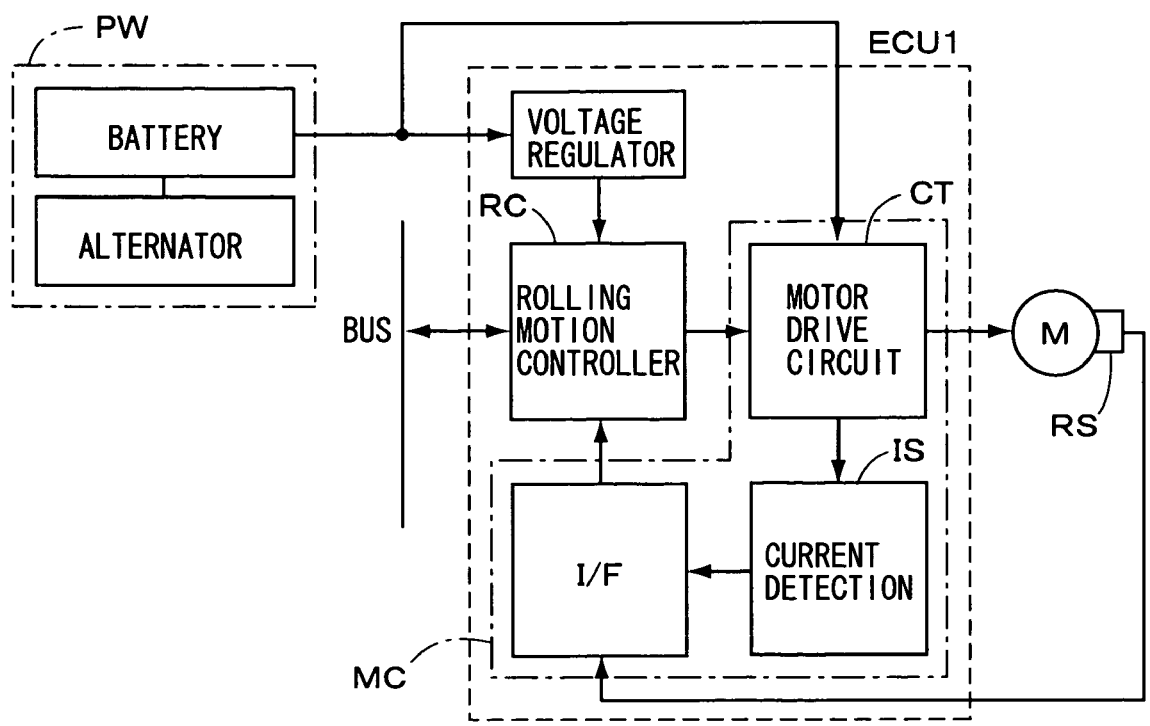
FIG. 6 is a block diagram of an example of a stabilizer control unit according to an embodiment of the present invention.

In the stabilizer actuator FT, the stabilizer control unit ECU1 which is provided with CPU, ROM and RAM for controlling the electric motor M, as shown in FIG. 6, for example. According to the stabilizer control unit ECU1 of the present embodiment, the voltage applied to the motor M by a motor drive circuit CT is regulated by a rolling motion controller RC. The electric current fed to the motor M from the motor drive circuit CT is detected by a current detection block IS, and fed back to the rolling motion controller RC through an interface I/F, together with the rotational angle signal of the motor M detected by the rotational angle sensor RS. The controller RC and motor drive circuit CT are connected to a power source PW. According to the present embodiment, a three-phase brushless motor is used for the motor M, while the motor M is not limited to it, but may be formed by a motor having other number of phases, even by a brush motor.

Figure 7:
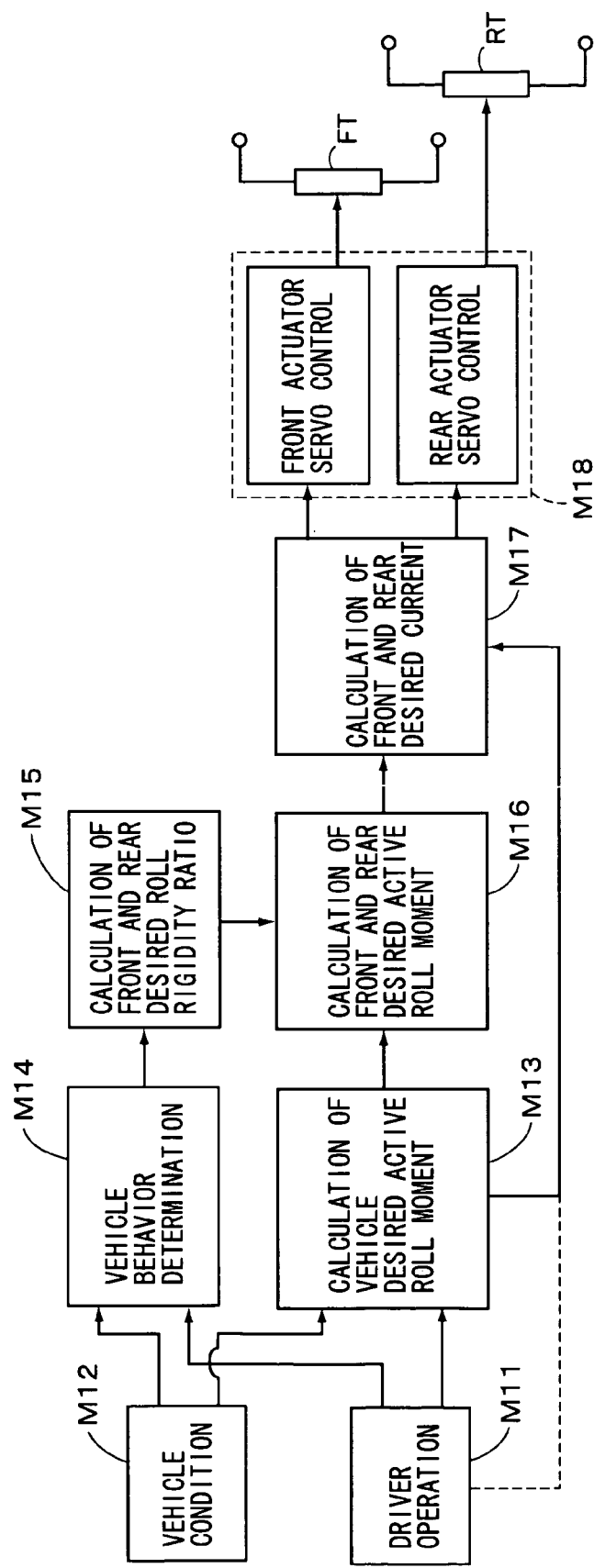
FIG. 7 is a block diagram of an active roll restraining control according to an embodiment of the present invention.
Figure 8:
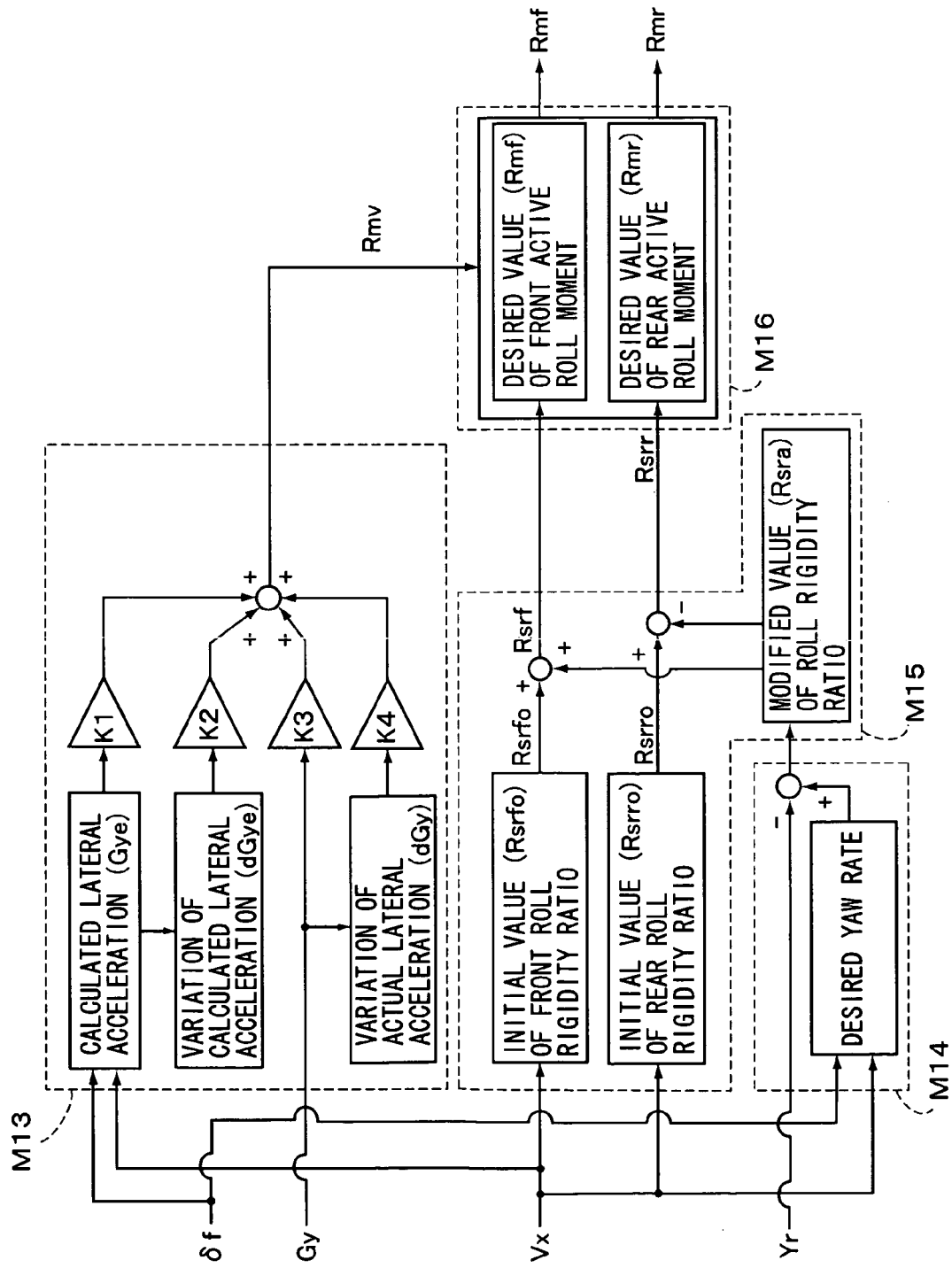
FIG. 8 is a block diagram of an example of the active roll restraining control as shown in FIG. 7.

Next, referring to FIG. 7, will be explained the active roll restraining control, wherein the information including the steering angle (handle angle) ($\delta f$) is detected by a vehicle driver operation detection device M11, and wherein vehicle motion variable including the vehicle speed, lateral acceleration and yaw rate is detected by a vehicle running condition detection device M12, On the basis of the detected information, a desired value of vehicle active roll moment is calculated at a block M13 to achieve a desirable rolling performance of the vehicle. At a vehicle behavior determination block M14, a vehicle steering performance (oversteer or understeer) is determined on the basis of the steering operation of the vehicle driver and the vehicle motion variable. Next, the desired value of the front and rear roll rigidity ratio is calculated at a block M15 on the basis of the calculated steering performance and vehicle motion variable. Based on the desired values of vehicle active roll moment and the roll rigidity ratios, the desired values of active roll moment for the front and rear wheels are calculated at a block M16, Then, on the basis of these desired values, the desired value of motor current will be converted at a block M17, and the stabilizer actuators FT and RT are controlled at an actuator servo block M18, FIG. 8 shows an example of the embodiment as shown in FIG. 7, wherein a desired value (Rmv) of vehicle active roll moment for restraining the rolling motion of the vehicle as a whole is calculated at the block M13, on the basis of the lateral acceleration (Gy) detected by the lateral acceleration sensor YG, the variation of actual lateral acceleration (dGy) obtained by differentiating the lateral acceleration (Gy), the calculated (or, estimated) lateral acceleration (Gye) calculated by the steering angle (handle angle) ($\delta f$) and vehicle speed (Vx), and the variation of the calculated lateral acceleration (dGye) obtained by differentiating the calculated lateral acceleration (Gye). The calculated lateral acceleration (Gye) can be obtained by the following equation (1):

$$Gye = (Vx^2 \cdot \delta f) / \{L \cdot N \cdot (1 + Kh \cdot Vx^2)\} \qquad (1)$$

where "L" is a wheel base, "N" is a steering gear ratio, and "Kh" is a stability factor.

Consequently, the desired value (Rmv) of active roll moment to be applied to the vehicle as a whole to achieve an appropriate rolling performance can be obtained by the following equation (2):

$$Rmv = K1 \cdot Gye + K2 \cdot dGye + K3 \cdot Gy + K4 \cdot dGy \qquad (2)$$

where K1-K4 are control gains.

As described above, the calculated lateral acceleration (Gye) obtained by the steering angle ($\delta f$) and vehicle speed (Vx) and its variation (dGye) are taken into consideration, so as to compensate a delay in calculation or the responsibility of the actuator.

Figure 9:
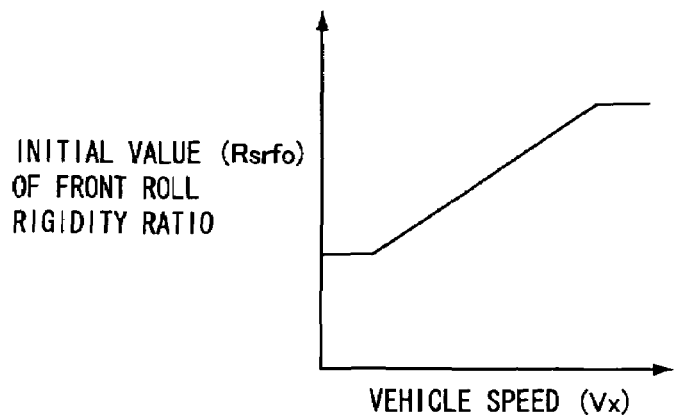
FIG. 9 is a diagram showing an example of a map for setting an initial value of a front roll rigidity ratio according to an embodiment of the present invention.

The desired value of the front and rear roll rigidity ratio is calculated at the block M15 as follows. At the outset, the initial values (Rsrfo) and (Rsrro) are set for the front roll rigidity ratio and rear roll rigidity ratio, respectively, on the basis of the vehicle speed (Vx). As shown in FIG. 9, the initial value (Rsrfo) for the front roll rigidity ratio is set to be relatively low when the vehicle is running at relatively low speed, whereas it is set to be relatively high when the vehicle is running at relatively high speed, to force the vehicle to be likely in the understeer condition when the vehicle is running at relatively high speed. Then, the initial value (Rsrro) for the rear roll rigidity ratio is set to be (1-Rsrfo). Next, a desired yaw rate (Yre) is calculated on the basis of the steering angle (δf) and vehicle speed (Vx) at the vehicle behavior determination block M14, to determine the vehicle steering performance, and then compared with the actual yaw rate (Yr) to obtain a yaw rate deviation (ΔYr), on the basis of which a modified value (Rsra) for the roll rigidity ratio is calculated. As a result, when the vehicle is likely to be in the understeer condition, the front roll rigidity ratio is modified to be decreased, and the rear roll rigidity ratio is modified to be increased. On the contrary, when the vehicle is likely to be in the oversteer condition, the front roll rigidity ratio is modified to be increased, and the rear roll rigidity ratio is modified to be decreased. Then, the desired value (Rmf) of active roll moment for the front wheel and the desired value (Rmr) of active roll moment for the rear wheel are calculated at the block M16, on the basis of the desired value (Rmv) of vehicle active roll moment, the desired value (Rsrf) of the front roll rigidity ratio, and the desired value (Rsrr) of the rear roll rigidity ratio, in accordance with the equations of [Rmf=Rmv·Rsrf] and [Rmr=Rmv·Rsrr], respectively. And then, the torsion force to be created at each of the front and rear stabilizer actuators FT and RT is determined on the basis of the desired values (Rsrf) and (Rsrr) of the front and rear roll rigidity ratios, respectively, to control the motor M.

Figure 10:
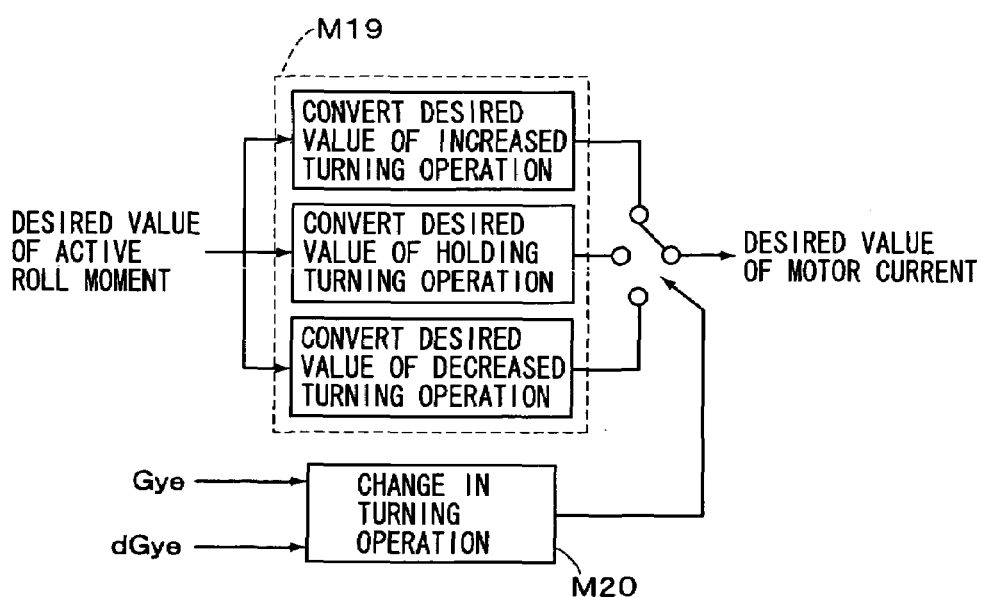
FIG. 10 is a block diagram of an example for setting a desired value of electric current for actuating an electric motor according to an embodiment of the present invention.

On the basis of the desired value (Rmf) of active roll moment for the front wheel and the desired value (Rmr) of active roll moment for the rear wheel, the desired value of the electric current fed to the motor M is set as shown in FIG. 10. The desired value of the electric current fed to the motor M (hereinafter, simply referred to as the desired value of motor current) is determined in view of the efficiency of the speed reducing mechanism RD, because of the following reason.

The efficiency of the motor M with the power transmitted to the stabilizer bars SBfr and SBfl through the speed reducing mechanism RD is named as the normal efficiency "ηP", whereas the efficiency of the motor M with the power given by the stabilizer bars SBfr and SBfl through the speed reducing mechanism RD is named as the reverse efficiency "ηN". In the case where a vehicle driver steers the steering wheel SW to increase the steering angle, thereby to increase the roll angle of the vehicle body, the roll moment (Tr) applied to the vehicle body (not shown) by controlling the stabilizer actuators FT and RT, is given by the following equation (3):

$$Tr = \eta P \cdot Kmr \cdot Tm1 \quad (3)$$

where "Kmr" is a factor for converting motor torque determined by a suspension geometry into the roll moment, and "Tm1" is torque output from the motor.

Thereafter, when the turning operation of the vehicle is decreased, so that the rolling motion of the vehicle body is converged, then the motor M begins to be returned to its initial position by the roll moment (Tr), at the amount of the motor torque (Tm2), which is obtained by the follwing equation (4):

$$Tm2 = Kmr = \eta N \cdot Tr \quad (4)$$

In accordance with the equations (3) and (4), the relationship between (Tm2) and (Tm1) can be obtained by the following equation (5):

$$Tm2 = \eta P \cdot \eta N \cdot Tm1 \quad (5)$$

Thus, as there exist a certain relationship between the torque output from the motor and the motor current, in the case where the vehicle driver steers the steering wheel SW to increase the steering angle, thereby to increase the turning operation of the vehicle, the motor current corresponding to the torque (Tm1) output from the motor M is set as the desired value. And, in the case where the vehicle driver steers the steering wheel SW to decrease the steering angle, thereby to decrease the turning operation of the vehicle, so that the rolling motion of the vehicle body is converged, then the motor current of the value smaller than the value of the torque (Tm1) output from the motor M multiplied by the normal efficiency and reverse efficiency of the speed decreasing mechanism RD (i.e., ηP·ηN·Tm1) is set as the desired value.

For example, if [ηP=0.8] and [ηN=0.7] are given, the result of [ηP·ηN] is 0.56. Then, supposing that the torque (Tm3) output from the motor M is given when the turning operation of the vehicle is increased, if the motor M outputs the torque equal to or greater than (0.56·Tm3), the motor M is placed not to be moved, i.e., in its locked state, whereas if the motor M outputs the torque smaller than (0.56·Tm3), the rolling motion will begin to be converged. In the case where it is determined that the turning motion of the vehicle is being decreased, therefore, if the torque output from the motor is set to be smaller than (0.56·Tm3), the convergence of the rolling motion can be improved.

Also, in the case where the steering wheel SW is held, and it is determined that the turning motion of the vehicle is being held, the motor M is only held to be in its locked state. Therefore, it is not required to keep feeding the motor current corresponding to the torque (Tm3) output from the motor M required in case of the increased turning operation, but it is sufficient to keep feeding the motor current corresponding to the torque equal to or greater than [ηP·ηN·Tm3], thereby to hold the motor M to be in its locked state. In case of the example as described above, if the torque equal to or greater than [0.56·Tm3] is created, the motor M can be in its locked state.

The conversion of the desired value (Rmf and Rmr) of active roll moment into the desired value of electric current fed to the motor M (desired value of motor current) is achieved at a block M19, on the basis of the result of determination of change in turning operation of the vehicle. The determination of change in turning operation of the vehicle in the present embodiment is made at a block M20 on the basis of the calculated lateral acceleration (Gye) and the variation thereof (variation in time) (dGye) obtained at the block in FIG. 8, in accordance with the following Table 1,

| No. | Gye | dGye | DETERMINATION OF CHANGE IN TURNING OPERATION |
|---|---|---|---|
| 1 | + | + | INCREASE |
| 2 | + | − | DECREASE |
| 3 | + | 0 | HOLD |
| 4 | 0 | + | INCREASE |
| 5 | 0 | − | INCREASE |
| 6 | 0 | 0 | HOLD |
| 7 | − | + | DECREASE |

-continued

| No. | Gye | dGye | DETERMINATION OF CHANGE IN TURNING OPERATION |
|---|---|---|---|
| 8 | − | − | INCREASE |
| 9 | − | 0 | HOLD |

In the Table 1, according to a combination of the calculated lateral acceleration (Gye) and the variation of calculated lateral acceleration (dGye), it is determined which one of the increased turning operation (abbreviated as "increase" in Table 1), decreased turning operation (abbreviated) as "decrease") and holding turning operation (abbreviated) as "hold") corresponds to the change in turning operation of the vehicle. According to the Table 1, if [−G1<Gye<G1] is fulfilled, the calculated lateral acceleration (Gye) is determined to be zero. If [Gye≧G1] is fulfilled, the calculated lateral acceleration (Gye) is determined to be "+". And, if [Gye≦−G1] is fulfilled, the calculated lateral acceleration (Gye) is determined to be "−". With respect to the variation of calculated lateral acceleration (dGye), if [−G2<dGye<G2] is fulfilled, the variation (dGye) is determined to be zero. If [dGye≧G2] is fulfilled, the variation (dGye) is determined to be "+". And, if [dGye≦−G2] is fulfilled, the variation (dGye) is determined to be "−". "G1" and "G2" are constants of positive value, and provided in advance.

Although the change in turning operation of the vehicle is determined according to the combination of the calculated lateral acceleration (Gye) and the variation of calculated lateral acceleration (dGye) in the Table 1 as described above, it may be determined on the basis of the steering angle, variation thereof, actual lateral acceleration, variation thereof, yaw rate and variation thereof. Or, it may be determined according to the combination of those result. Furthermore, since the change in rolling motion of the vehicle body is resulted from the change in turning operation of the vehicle, the change in turning operation of the vehicle as determined above may be employed as the determination of the change in rolling motion of the vehicle body.

Figure 11:
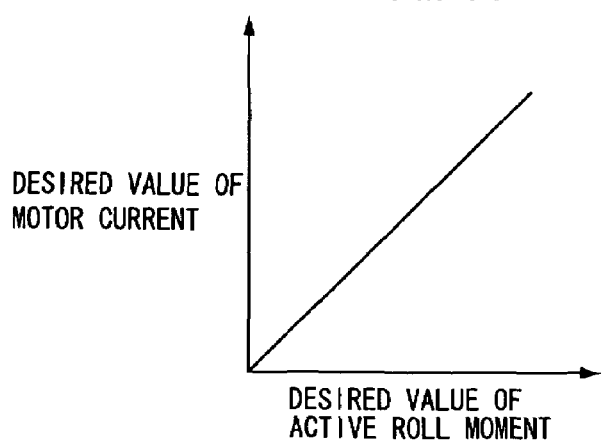
FIG. 11 is a diagram showing an example of a map for calculating a desired value of electric current for actuating a motor according to an embodiment of the present invention.

Thus, based upon the result of determination of the change in turning operation of the vehicle, one of the conversions at the time of the increased turning operation, decreased turning operation and holding turning operation is selected. Accordingly, the desired values (Rmf and Rmr) of front and rear active roll moment are obtained as shown in FIG. 8, and then the desired value of motor current is calculated on the basis of the desired values (Rmf and Rmr) of active roll moment as shown in FIG. 11, The desired value of motor current as calculated in this case is provided as a normal desired value of motor current, which is set in response to the desired value (Rmf and Rmr) of active roll moment when the turning operation is being increased.

If it is determined that the turning operation is being decreased, the normal desired value of motor current as described above is modified to provide the desired value of motor current, so as to converge the rolling motion of the vehicle body immediately, as explained hereinafter with reference to FIG. 12, At the time (t4) in FIG. 12, the turning operation is changed from "hold" to "decrease". In this case, when the turning operation continues to be decreased for a predetermined time period on the basis of the Table 1 as described above, it is determined that the turning operation is decreased. Although it is determined that the turning operation is decreased at the time (t4') in FIG. 12, it has not been determined that the turning operation is decreased, during the period of (t4-t4'), so that the normal desired value of motor current has been used. When it is determined that the turning operation is decreased at the time (t4'), the desired value of motor current is immediately decreased from (Imt4') to (Imt5). If the desired value of motor current comes to be smaller than the value of the normal desired value of motor current multiplied by (ηP·ηN), i.e., the value multiplied by the normal efficiency and reverse efficiency of the speed decreasing mechanism RD, then the rolling motion of the vehicle body will be converged to be balanced in roll moment. Therefore, the desired value (Imt5) of motor current is set to be equal to or smaller than the value of the normal desired value of motor current, as indicated by a two-dotted chain line in FIG. 12, multiplied by (ηP·N). Furthermore, in the case where a priority is given to the convergence of the rolling motion of the vehicle body, the current supply to the motor M may be reduced rapidly to decrease the desired value of motor current to be zero, as indicated by a thick broken line in FIG. 12, after it is determined that the turning operation is decreased. "TCN" in FIGS. 12-14 indicates the amount of turning operation.

Figure 12:
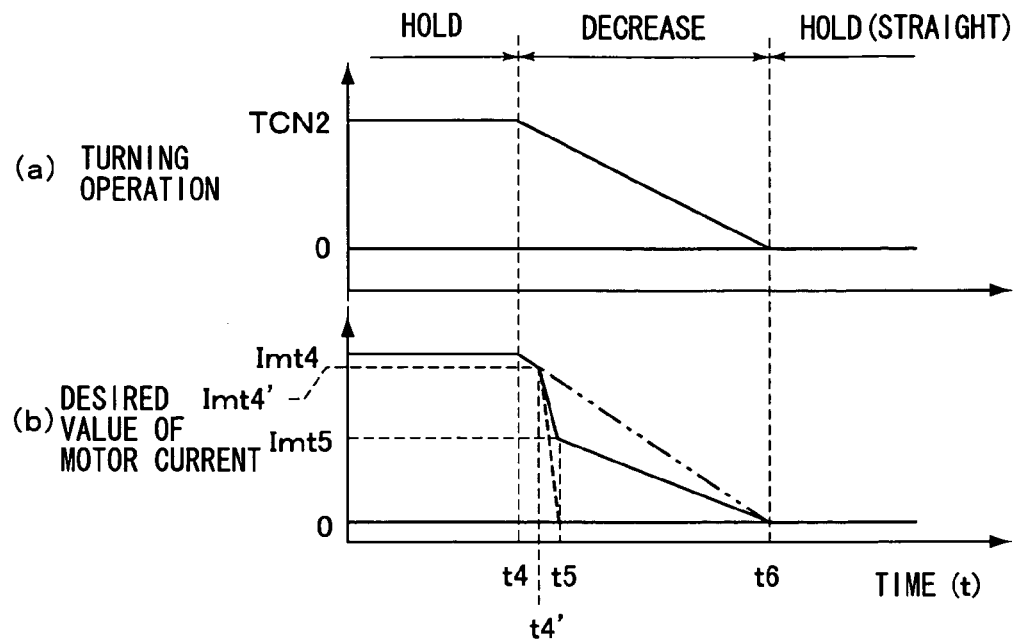
FIG. 12 is a diagram showing an example of modifying a desired value of motor current, in the case where the holding turning operation has been shifted to the decreased turning operation, according to an embodiment of the present invention.
Figure 13:
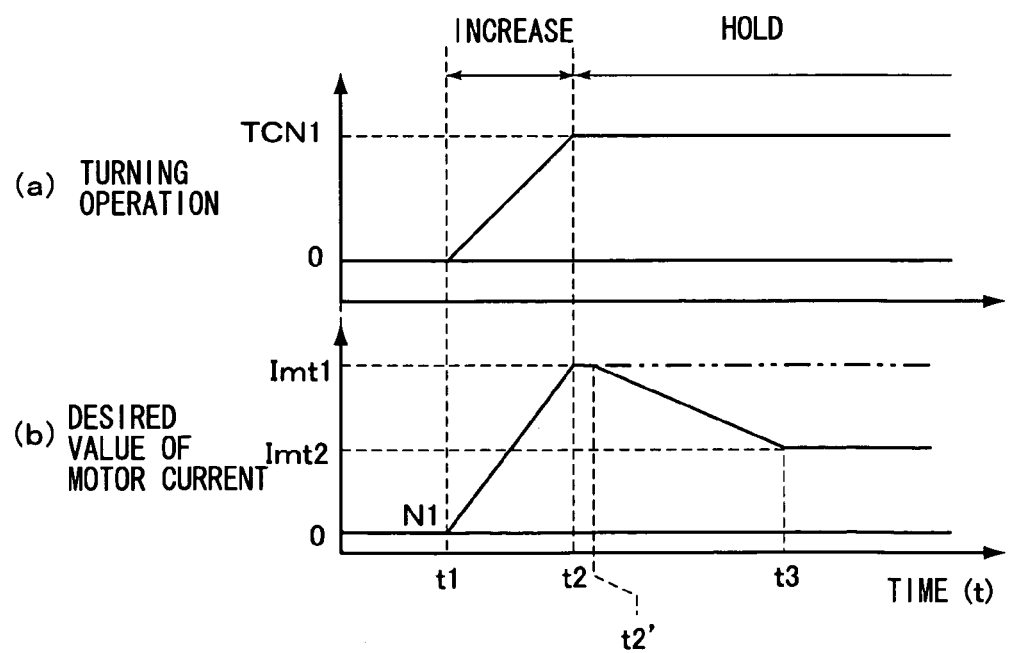
FIG. 13 is a block diagram of an example for setting a desired value of electric current for actuating an electric motor, in the case where it is determined that the turning operation is being held, according to an embodiment of the present invention.

As described above, the turning operation is changed from "hold" to "decrease" in FIG. 12, whereas the similar control can be made in the case where the turning operation is changed from "increase" to "decrease". As explained with reference to FIG. 4, there exists such a condition that the relative displacement of the stabilizer bars SBfr and SBfl is locked, depending upon the relationship between the output of the motor M and the efficiency of the speed reducing mechanism RD in each of the stabilizer actuators FT and RT. With that condition employed, the output of the motor M can be reduced, when the turning operation is held, as shown in FIG. 13, If the desired value of motor current which is provided when the turning operation is held, is set as the normal desired value of motor current, the performance as indicated by the two-dotted chain line in FIG. 13 can be obtained. However, in order to hold the motor M in its locked state, it is sufficient to provide the output of the motor M corresponding to the value greater than the normal desired value (Imt1) multiplied by (ηP·ηN). In other words, the value (Imt1) as indicated by the two-dotted chain line in FIG. 13 is not required. Therefore, in the case where it is determined that the turning operation is being held, the rolling motion will not be changed, even if the output of the motor M is reduced.

Referring to FIG. 13, will be explained the desired value of motor current which is provided when it is determined that the turning operation is being held. In FIG. 13, the turning operation is increased during the period of the time (t1) to time (t2), and held thereafter. Then, if it is determined that the turning operation is being held at the time (t2'), according to the Table 1 as described above, the desired value of motor current will be decreased from (Imt1) to (Imt2) according to a certain gradient to time. Although the locked state can be maintained, provided that the desired value (Imt2) of motor current at this time is set to be greater than the value (Imt1)·(ηP·ηN), it is desirable that 20-30% margin is added to the value. And, the desired value of motor current is held, at the time when it reaches the desired value (Imt2) required for holding the turning operation of the vehicle, i.e., at the time (t3) in FIG. 13, Although the turning operation is changed from "increase" to "hold" in FIG. 13, the similar control can be made in the case where the turning operation is changed from "decrease" to "hold".

Figure 14:
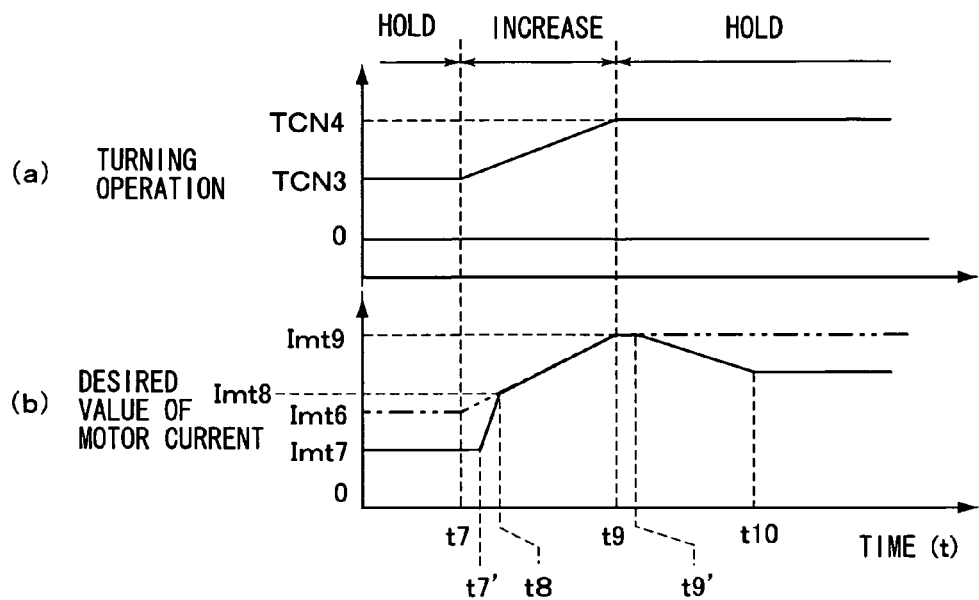
FIG. 14 is a block diagram of an example for setting a desired value of electric current for actuating an electric motor, when the turning operation is increased, while the desired value of motor current is being reduced when the turning operation is being held, according to an embodiment of the present invention.
Figure 15:
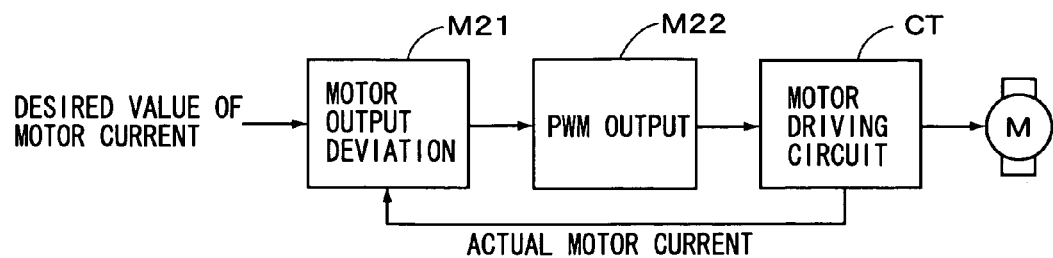
FIG. 15 is a block diagram of an example of a motor control according to an embodiment of the present invention.

FIG. 14 shows such a state that where the desired value of motor current is set, when the turning operation of the vehicle comes to be increased, in the case where the desired value of motor current is decreased while the turning operation is being held. The values (Imt8) and (Imt9) indicated by broken lines in FIG. 14 represent the normal desired value of motor current. At the time (t7), the turning operation is changed from "hold" to "increase", and it is determined that the turning operation is being increased at the time (t7'), according to the Table 1 as described above. In this case, the desired value of motor current is decreased down to (Imt7), which can be increased immediately up to the desired value of motor current required for the control of the increased turning operation of the vehicle. Then, the desired value of motor current is set to correspond to the normal desired value of motor current, at the time when the former reaches the latter, i.e., at the time (t8) in FIG. 14, And, FIG. 15 shows an embodiment of the actuator servo control block M18 as shown in FIG. 7, The desired value of motor current as calculated above and the actual value of motor current are compared to provide a deviation of motor current at a block M21. In response to the deviation of motor current, PWM signals fed to the motor M are determined at a block M22, and switching elements in the motor drive circuit CT are controlled by the PWM signals, to control the motor M.

Figure 16:
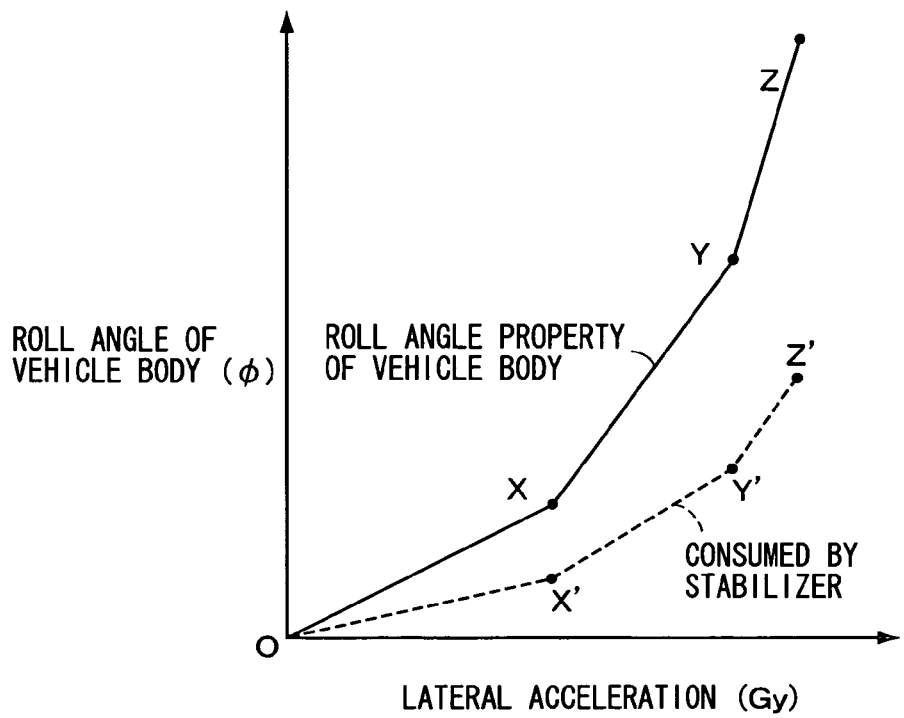
FIG. 16 is a diagram showing an example of a lateral acceleration and roll angle of a vehicle body, in the case where the output of electric motor does not cover the whole area of active roll restraining control, as another embodiment of the present invention.

Next will be explained a control to be performed in the case where the output of the motor M is not enough to cover the whole range of the active roll restraining control. In order to evaluate the relationship between the output of the motor M and the roll angle of the vehicle body considering the efficiency of the speed reducing mechanism RD, FIG. 16 shows the relationship between the lateral acceleration (Gy), i.e., inertia force applied to the vehicle body, and the roll angle ($\phi$) of the vehicle body. In the normal rolling motion, the vehicle body is supported by spring elements (helical spring, leaf spring, pneumatic spring or the like) disposed on each wheel. As the output of the motor M in the stabilizer actuator is within the range "O-X" ("O" indicates the origin), the torsion spring constant, or the torsional rigidity, is increased to reduce a varying rate (rolling rate) of the roll angle ($\phi$) to the lateral acceleration (Gy). In the range "X-Y", the motor M is locked so as to provide an inherent torsional rigidity of a stabilizer bar, corresponding to the torsional rigidity which is obtained when the divided stabilizer bars (e.g., SBfr and SBfl) are fixed. In the range "Y-Z", the motor M is rotated so as to return the stabilizer bar to its original state against the torsion, by the inertia force acting on the vehicle body. As a result, the torsional rigidity of the stabilizer bar is reduced, thereby to increase the roll angle of the vehicle body.

Figure 17:
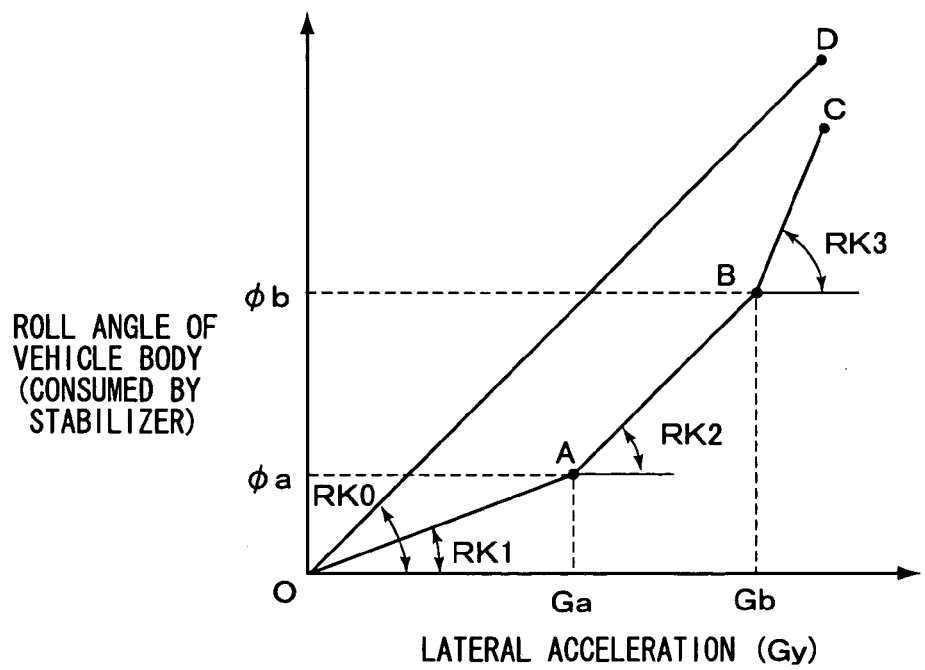
FIG. 17 is a diagram showing the relationship between the lateral acceleration and the roll angle as shown in FIG. 16, in a simplified form.

FIG. 17 shows the relationship between the lateral acceleration (Gy) and the roll angle ($\phi$), which is provided for a simplified structure with only the stabilizer for supporting the vehicle, without the above-described spring elements as shown in FIG. 16 being provided, and which is divided into three ranges. At the outset, a range 1 with the lateral accelerations (0-Ga) corresponds to a range capable of performing an active control of the rolling motion of the vehicle body, so that the relationship of rolling rate is [RK1<RK0]. Next, a range 2 with the lateral accelerations (Ga-Gb) corresponds to a range in which the relative displacement of the divided stabilizer bars is locked, to provide a passive torsional rigidity for the stabilizer, i.e., a range for providing the torsional rigidity when the divided stabilizer bars are fixed, so that the relationship of rolling rate is [RK2=RK0]. And, a range 3 with the lateral accelerations equal to or greater than (Gb) corresponds to a range in which the motor M is forced to be returned by the external force (inertia force acting on the vehicle body), to reduce the torsional rigidity of the stabilizer, so that the relationship of rolling rate is [RK3>RK0]. The rolling rate as described above corresponds to a varying rate of the roll angle ($\phi$) to the lateral acceleration (Gy), and (RK0) indicates the rolling rate for the torsion spring performance obtained when the divided stabilizer bars (e.g., SBfr and SBfl).are fixed.

Next will be explained a property of "O-A-B-C" which is provided when the efficiency of the speed reducing mechanism RD is taken into consideration. In this case, the efficiency of the motor M with the power transmitted to the stabilizer bars SBfr and SBfl through the speed reducing mechanism RD is named as the normal efficiency ($\eta P$), whereas the efficiency of the motor M, which is returned by the force input from the stabilizer through the speed reducing mechanism RD, is named as the reverse efficiency ($\eta N$). With respect to a balance between the output torque of the motor M (corresponding to a roll moment Tma) and a roll moment (Tra) resulted from the inertia force (lateral acceleration) acting on the vehicle body at the intersection (A) between the range 1 and range 2, the range 1 is included in a range capable of providing the output from the motor M. Therefore, it is the range, in which the motor M transmit the power to the stabilizer bars SBfr and SBfl, to satisfy the following equation (6):

$$Tra = Tma \cdot \eta P \qquad (6)$$

On the contrary, with respect to a balance between the output torque of the motor M (corresponding to a roll moment Tmb) and a roll moment (Trb) resulted from the inertia force (lateral acceleration) acting on the vehicle body at the intersection (B) between the range 2 and range 3, the range 3 is included in a range with the motor M returned by the inertia force of the vehicle body, to satisfy the following equation (7):

$$Trb = Tmb \cdot \eta N \qquad (7)$$

With the active roll restraining control performed to restrain the roll angle of the vehicle body actively, the output torque of the motor M is increased in response to increase of the turning operation, so as to hold the output torque of the motor M at the point (A), i.e., output limit of the motor M, then the output of the motor M will be controlled to provide [Tma=Tmb]. As a result, the following equation (8) can be obtained by the equations (6) and (7) as described above:

$$Trb = Tra / (\eta P \cdot N) \qquad (8)$$

As the roll moment resulted from the inertia force of the vehicle body is approximately proportional to the lateral acceleration, the following equation (9) can be obtained by the equation (8), where the lateral accelerations obtained at the positions (A) and (B) are indicated by (Ga) and (Gb), respectively.

$$Gb = Ga \cdot \{1/(\eta P \cdot \eta N)\} \qquad (9)$$

In such a range that the torque output of the motor M is enough to cover a range for performing the active roll restraining control, the active roll restraining control is performed. If the turning operation is increased further, to increase the lateral acceleration, and exceed the lateral acceleration (Ga), which corresponds to the limit of the motor torque output as indicated by (A) in FIG. 17, then the motor M will be controlled to maintain its output. The lateral acceleration (Gb) corresponds to (B) in FIG. 17, where the motor M begins to be returned by the inertia force of the vehicle body, and it is called as a stabilizer lock limit. And, the lateral acceleration (Gb) can be obtained by multiplying the lateral acceleration corresponding to the limit of the motor torque output by the inverse of the product of the normal efficiency and reverse efficiency of the speed reducing mechanism RD. By maintaining the output of the motor M, therefore, on the basis of the relationship between the normal efficiency required when the motor M applies the torsion to the stabilizer bars SBfr and SBfl, and the reverse efficiency required when the motor M is returned by the inertia force of the vehicle body, the relative displacement of the stabilizer bars SBfr and SBfl is locked in the range (A-B) as shown in FIG. 17, With respect to the active roll restraining apparatus, therefore, if the output of the motor M is not enough to cover the whole range of the active roll restraining control, it is appropriate to control a maximal turning operation of the vehicle to be equal to or smaller than (Gb), by designing or selecting the efficiency (normal efficiency and reverse efficiency) of the speed reducing mechanism RD to be fallen within an appropriate range. And, it is so adjusted that the range (B-C) in FIG. 17 will not be made actually, by setting (Gb) to be larger enough than a limit of friction of tire, for example, whereby the rolling motion of the vehicle body will be prevented from being rapidly increased.

Figure 18:
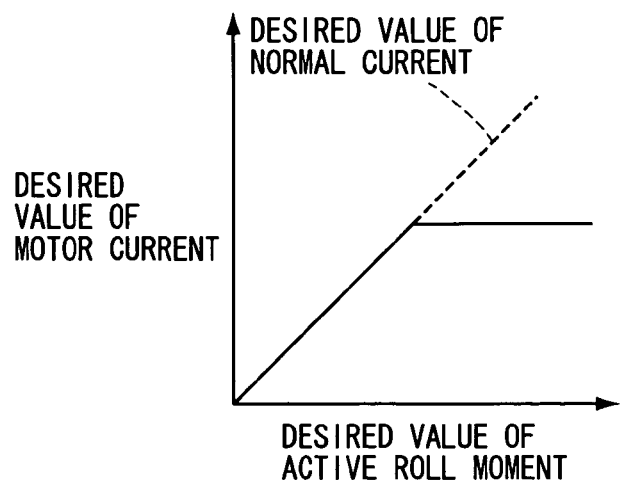
FIG. 18 is a diagram showing an example of a map for calculating a desired value of electric current for actuating a motor according to another embodiment of the present invention.

In the case where the desired value of the active roll moment, which is provided when the output of the motor M is not enough to cover the whole range of the active roll restraining control, is converted into the desired value of motor current, a property of the converted result as shown in FIG. 18 will be limited to a certain upper limit, with respect to the normal desired value of motor current (as indicated by a broken line in FIG. 18) which is set to be corresponding to the desired value of the active roll moment. Therefore, the desired value of motor current might be held, in such a case that the output of the motor M has reached its upper limit, for example, even if the turning operation has not been held as described before. In this case, if the current greater than the normal desired value of motor current multiplied by ($\eta P \cdot \eta N$) is being fed to the motor M, in the same manner as explained with reference to FIG. 13, the motor M will not be returned by the torsion, so that the relative displacement of the divided stabilizer bars SBfr and SBfl is held to be fixed.

Figure 19:
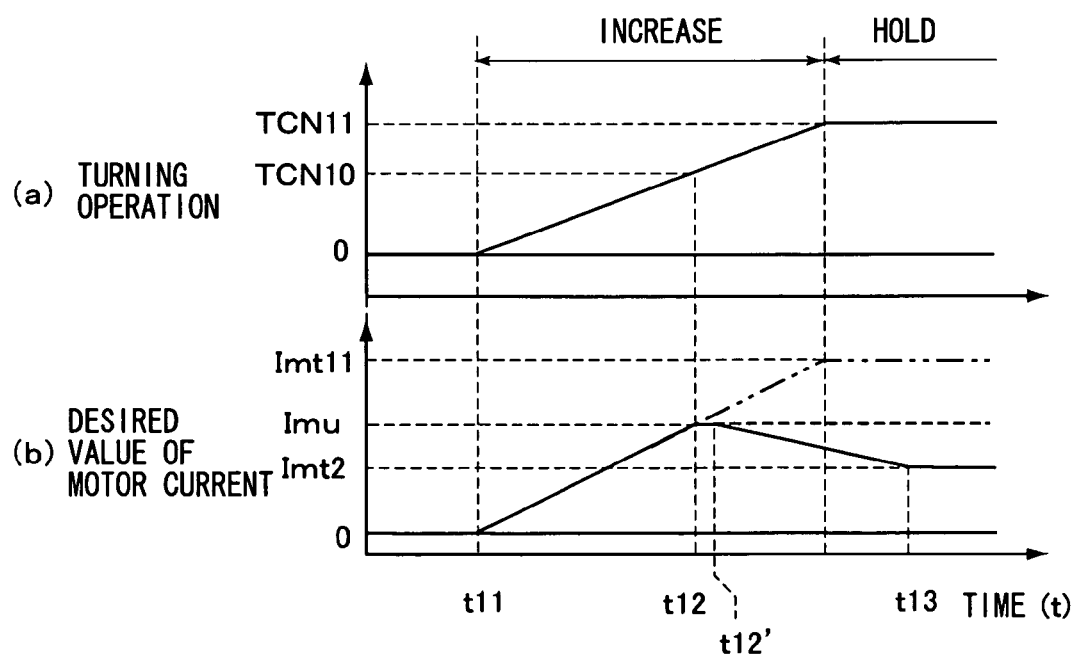
FIG. 19 is a diagram showing an example of a motor control, in the case where the turning operation has exceeded the upper limit of output of the motor, according to an embodiment of the present invention.

Next will be explained the motor control to be made when the turning operation of the vehicle exceeds the output limit of the motor M. In FIG. 19, the turning operation begins at the time (t11), and is increased to reach the upper limit (Imu) for the desired value of motor current, i.e., reach the output limit of the motor M, at the time (t12). The turning operation of the vehicle is increased further, and if it is determined that the turning operation is being increased at the time (t12'), the desired value of motor current is decreased down to the value required for maintaining the locked state of the motor M, and held at the time (t13) when it reaches the value required for locking the motor M. The desired value of motor current for maintaining the locked state of the motor M is required to be greater than the value of the normal desired value of motor current (as indicated by a two-dotted chain line in FIG. 19) multiplied by the normal efficiency ($\eta P$) and reverse efficiency ($\eta N$) of the speed reducing mechanism RD, preferably with 20-30% margin added to the value.

According to the stabilizer control apparatus as described above for controlling the rolling motion of the vehicle actively, by means of the stabilizer actuator FT having the motor M and speed reducing mechanism RD disposed between the divided stabilizer bars SBfr and SBfl, a smooth and rapid control can be achieved. In addition, when the motor M is locked, the electric current required only for maintaining its locked state can be fed to it, so that it is effective in view of energy efficiency, as well.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A stabilizer control apparatus for a vehicle, comprising:
   a stabilizer including a pair of stabilizer bars disposed between a right wheel and a left wheel of said vehicle, and an actuator having an electric motor and a speed reducing mechanism disposed between said stabilizer bars, said speed reducing mechanism possessing an efficiency;
   turning determination means for determining change in turning operation of said vehicle; and
   control means for changing a control parameter of said electric motor based on the efficiency of the speed reducing mechanism and in response to the result determined by said turning determination means, to control a torsional rigidity of said stabilizer.

2. A stabilizer control apparatus for a vehicle, comprising:
   a stabilizer including a pair of stabilizer bars disposed between a right wheel and a left wheel of said vehicle, and an actuator having an electric motor and a speed reducing mechanism disposed between said stabilizer bars, said speed reducing mechanism possessing an efficiency;
   turning determination means for determining change in turning operation of said vehicle; and
   control means for reducing electric current fed to said electric motor based on the efficiency of the speed reducing mechanism, when said turning determination means determines that the turning operation of said vehicle is being decreased, to control a torsional rigidity of said stabilizer.

3. A stabilizer control apparatus for a vehicle as set forth in claim 2, wherein said control means reduces the electric current fed to said electric motor, to be smaller than the electric current corresponding to a value of a normal efficiency of said speed reducing mechanism and a reverse efficiency thereof multiplied together, when said turning determination means determines that the turning operation of said vehicle is being decreased.

4. A stabilizer control apparatus for a vehicle, comprising:
   a stabilizer including a pair of stabilizer bars disposed between a right wheel and a left wheel of said vehicle, and an actuator having an electric motor and a speed reducing mechanism disposed between said stabilizer bars, said speed reducing mechanism possessing an efficiency;
   turning determination means for determining change in turning operation of said vehicle; and
   control means for reducing electric current fed to said electric motor based on the efficiency of the speed reducing mechanism and, when said turning determination means determines that the turning operation of said vehicle is being held, to control a torsional rigidity of said stabilizer.

5. A stabilizer control apparatus for a vehicle as set forth in claim 4, wherein said control means reduces the electric current fed to said electric motor, within a range greater than the electric current corresponding to a value of a normal efficiency of said speed reducing mechanism and a reverse efficiency thereof multiplied together, when said turning determination means determines that the turning operation of said vehicle is being held.

6. A stabilizer control apparatus for a vehicle as set forth in claim 5, wherein said control means increases the electric current fed to said electric motor, to come to be in such a condition of said electric motor that the turning operation of said vehicle is being increased, when said turning determination means determines that the turning operation of said vehicle is being increased, in the case where said control means is reducing the electric current fed to said electric motor, while the turning operation of said vehicle is being held.

7. A stabilizer control apparatus for a vehicle as set forth in claim 4, wherein said control means increases the electric current fed to said electric motor, to come to be in such a condition of said electric motor that the turning operation of said vehicle is being increased, when said turning determination means determines that the turning operation of said vehicle is being increased, in the case where said control means is reducing the electric current fed to said electric motor, while the turning operation of said vehicle is being held.

* * * * *